US011621960B2

(12) United States Patent
Sabnis et al.

(10) Patent No.: US 11,621,960 B2
(45) Date of Patent: Apr. 4, 2023

(54) SYSTEM AND METHOD TO UPDATE AIRCRAFT MAINTENANCE RECORDS USING BLOCKCHAIN TECHNOLOGY

(71) Applicant: HONEYWELL INTERNATIONAL INC., Morris Plains, NJ (US)

(72) Inventors: Rohini Sabnis, Bangalore (IN); Imtiaz Elahi, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 981 days.

(21) Appl. No.: 16/423,615

(22) Filed: May 28, 2019

(65) Prior Publication Data

US 2020/0382503 A1  Dec. 3, 2020

(51) Int. Cl.
*H04L 9/00* (2022.01)
*H04L 9/40* (2022.01)
(Continued)

(52) U.S. Cl.
CPC ............ *H04L 63/10* (2013.01); *G06F 16/901* (2019.01); *G06F 21/62* (2013.01); *G06Q 10/20* (2013.01);
(Continued)

(58) Field of Classification Search
CPC .. G06Q 2220/00; G06Q 20/382; G06Q 10/20; H04L 9/50; H04L 67/104;
(Continued)

(56) References Cited

U.S. PATENT DOCUMENTS

| 7,669,051 B2 * | 2/2010 | Redlich | G06F 21/6254 |
| | | | 713/166 |
| 8,837,718 B2 * | 9/2014 | Lauter | H04L 9/0836 |
| | | | 380/278 |

(Continued)

FOREIGN PATENT DOCUMENTS

DE  102017204538 A1  9/2018

OTHER PUBLICATIONS

Aleshi, Ahrash, "Secure Aircraft Maintenance Records Using Blockchain (SAMR)" (2018). Dissertations and Theses. 379. https://commons.erau.edu/edt/379, downloaded on Feb. 22, 2019.

*Primary Examiner* — Josnel Jeudy
(74) *Attorney, Agent, or Firm* — Bookoff McAndrews PLLC

(57) ABSTRACT

A method in a peer-to-peer network for recording maintenance data is provided. The method comprises receiving troubleshooting summary secured data (TSSD) from a plurality of sources; entering the TSSD from the plurality of sources using a Blockchain framework, wherein TSSD from a source is entered as a unique transaction in the Blockchain framework when a set of smart maintenance keys possessed by the source authorizes the entry of the TSSD; providing a first level of controlled access to a first subset of entered TSSD to an entity possessing a first level controlled access set of keys; providing a second level of controlled access to a second subset of the entered TSSD to an entity possessing a second level controlled access set of keys; and providing a third level of controlled access to all of the entered TSSD to an entity possessing a third level controlled access set of keys.

20 Claims, 6 Drawing Sheets

(51) Int. Cl.

| | |
|---|---|
| *G07C 5/00* | (2006.01) |
| *H04L 9/06* | (2006.01) |
| *H04L 67/104* | (2022.01) |
| *G06Q 10/20* | (2023.01) |
| *G06F 16/901* | (2019.01) |
| *G06F 21/62* | (2013.01) |
| *G06Q 20/38* | (2012.01) |
| *G08G 5/00* | (2006.01) |

(52) U.S. Cl.
CPC ........... *G06Q 20/382* (2013.01); *G07C 5/006* (2013.01); *G08G 5/0021* (2013.01); *H04L 9/0637* (2013.01); *H04L 9/0643* (2013.01); *H04L 63/04* (2013.01); *H04L 63/105* (2013.01); *H04L 67/104* (2013.01); *G06Q 2220/00* (2013.01); *H04L 9/50* (2022.05)

(58) Field of Classification Search
CPC ..... H04L 63/105; H04L 63/04; H04L 9/0643; H04L 9/0637; H04L 63/10; G08G 5/0021; G07C 5/006; G06F 21/62; G06F 16/901
USPC .............................................................. 701/3
See application file for complete search history.

(56) References Cited

U.S. PATENT DOCUMENTS

| | | | |
|---|---|---|---|
| 2009/0092139 A1* | 4/2009 | Coley | .................... H04L 65/80 370/395.4 |
| 2017/0346644 A1* | 11/2017 | Cambou | ................. H04L 63/08 |
| 2018/0225651 A1 | 8/2018 | Stone et al. | |
| 2018/0341915 A1 | 11/2018 | Narasimhan | |
| 2018/0349621 A1 | 12/2018 | Schvey et al. | |
| 2021/0157561 A1* | 5/2021 | Gilton | ...................... G06F 8/61 |

\* cited by examiner

SYSTEM AND METHOD TO UPDATE AIRCRAFT MAINTENANCE RECORDS USING BLOCKCHAIN TECHNOLOGY

TECHNICAL FIELD

The present disclosure generally relates to systems and methods for updating aircraft maintenance records, and more particularly relates to using blockchain technology to update and maintain aircraft maintenance records.

BACKGROUND

Aircraft maintenance repair records, maintenance review board records (MRB) and airworthiness reports involve a lot of documentation and must be maintained for at least a few years. Airlines and aircraft operators are trending toward keeping electronic maintenance records instead of paper records. Electronic records can suffer from: data loss and data integrity issues during electronic record transfer between different systems, lack of format compatibility between different operators, long lag periods when transferring maintenance records between different entities for approval, concern regarding physical integrity of the media on which the information will be saved (e.g., in a cloud, bubble memory or internal servers), privacy concerns regarding how maintenance information is accessed and shared, and concern regarding the lack of secure transit of maintenance records between different entities.

An airworthiness agency, such as the FAA, depends on the authenticity of maintenance records. The maintenance records need to be easily accessible to maintenance personnel with a need for the records while inaccessible to those without a need for the records. Efficiency in hand-offs and turnaround time for maintenance records that must be completed by different entities is desirable.

Hence, it is desirable to provide an improved system and method for maintaining aircraft maintenance records. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A maintenance system for securely maintaining aircraft maintenance operations transactions is provided. The maintenance system includes one or more processors configured by programming instructions on non-transient computer readable media. The maintenance system is configured to: provide a plurality of data entry access levels to the maintenance system for accessing and entering aircraft maintenance data in the form of troubleshooting summary secured data (TSSD), wherein each data entry access level provides access for retrieval of a specific class of TSSD and input of a specific class of TSSD; provide a plurality of unique sets of smart maintenance keys, wherein each unique set of smart maintenance keys corresponds to one of the plurality of data entry access levels for accessing and entering TSSD; enter TSSD from a plurality of sources, wherein each entry of TSSD is entered as a unique transaction, in a peer to peer network using a Blockchain framework, and wherein each entry of TSSD is received from a source presenting a set of smart maintenance keys that authorizes the entry of the TSSD presented for entry by the source; update a private ledger on the peer to peer network for each unique transaction; provide a first level of controlled access to a first subset of entered TSSD to an entity possessing a first level controlled access set of keys; provide a second level of controlled access to a second subset of the entered TSSD to an entity possessing a second level controlled access set of keys, wherein the first level of controlled access is different from the second level of controlled access; and provide a third level of controlled access to all of the entered TSSD to an entity possessing a third level controlled access set of keys.

A method in a peer to peer network for recording maintenance data is disclosed. The method includes providing a plurality of data entry access levels to a maintenance system for accessing and entering aircraft maintenance data in the form of troubleshooting summary secured data (TSSD), wherein each data entry access level provides access for retrieval of a specific class of TSSD and input of a specific class of TSSD; providing a plurality of unique sets of smart maintenance keys, wherein each unique set of smart maintenance keys corresponds to one of the plurality of data entry access levels for accessing and entering TSSD; entering TSSD from a plurality of sources, wherein each entry of TSSD is entered as a unique transaction, in the peer to peer network using a Blockchain framework, and wherein each entry of TSSD is received from a source presenting a set of smart maintenance keys that authorizes the entry of the TSSD presented for entry by the source; updating a private ledger on the peer to peer network for each unique transaction; providing a first level of controlled access to a first subset of entered TSSD to an entity possessing a first level controlled access set of keys; providing a second level of controlled access to a second subset of the entered TSSD to an entity possessing a second level controlled access set of keys, wherein the first level of controlled access is different from the second level of controlled access; and providing a third level of controlled access to all of the entered TSSD to an entity possessing a third level controlled access set of keys.

Another method in a peer to peer network for recording maintenance data is disclosed. The method includes receiving aircraft maintenance data in the form of troubleshooting summary secured data (TSSD) from a plurality of sources, wherein each source has a unique set of smart maintenance keys; entering the TSSD from the plurality of sources in the peer to peer network using a Blockchain framework, wherein TSSD from a source is entered as a unique transaction in the Blockchain framework when the set of smart maintenance keys from the source authorizes the entry of the TSSD; providing a first level of controlled access to a first subset of entered TSSD to an entity possessing a first level controlled access set of keys; providing a second level of controlled access to a second subset of the entered TSSD to an entity possessing a second level controlled access set of keys, wherein the first level of controlled access is different from the second level of controlled access; and providing a third level of controlled access to all of the entered TSSD to an entity possessing a third level controlled access set of keys.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Various embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
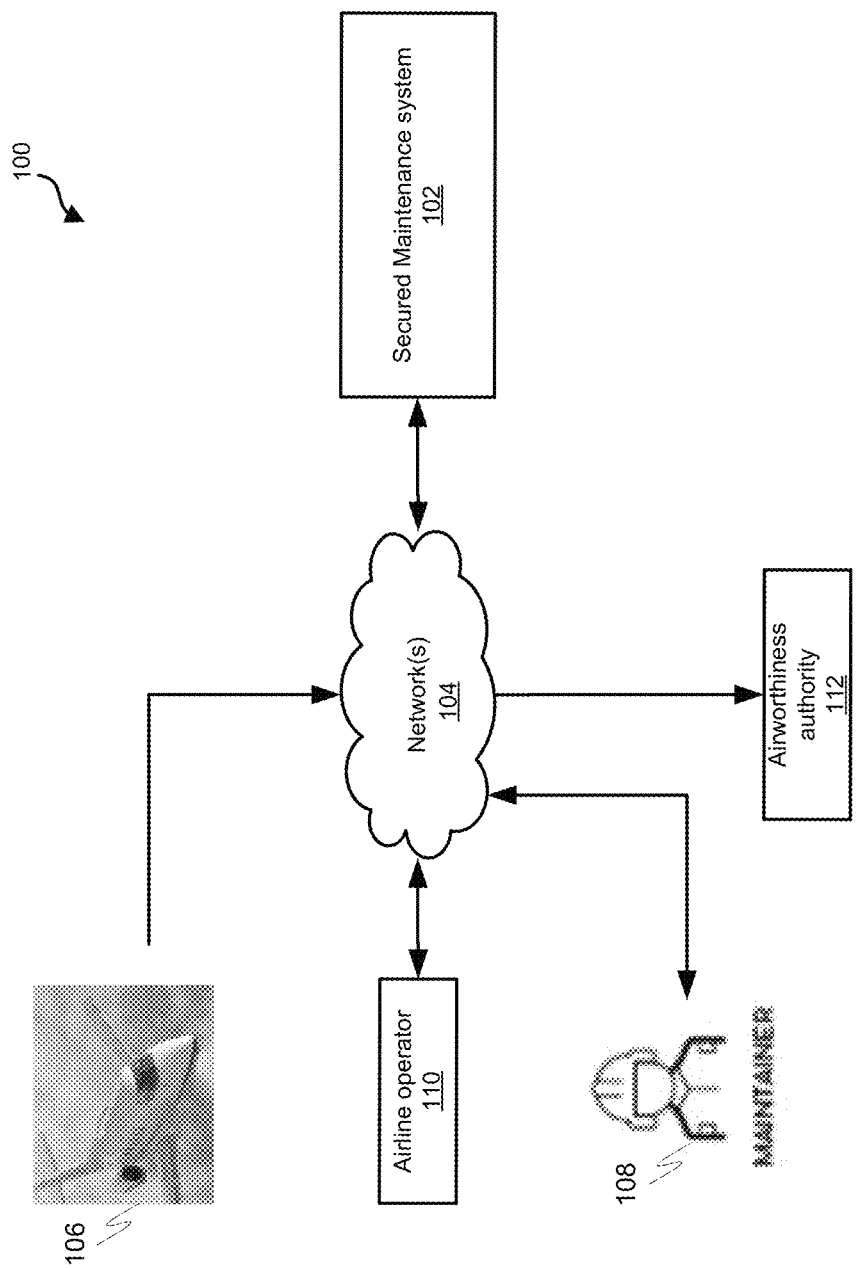
FIG. 1 is a block diagram depicting an aircraft maintenance environment, in accordance with some embodiments.

FIG. 1 is a block diagram depicting an example aircraft maintenance environment 100. The example aircraft maintenance environment 100 includes an example secured maintenance system 102 configured for providing controlled access to the system for both entering and recording aircraft maintenance information and for reviewing the entered aircraft maintenance information. The example secured maintenance system 102 uses a peer to peer network and Blockchain transactions to secure aircraft maintenance information stored therein, uses security protocols to provide controlled access to entities that may enter specific aircraft maintenance information therein, and also uses security protocols to provide controlled access for reviewing the secured aircraft maintenance information stored therein.

The example secured maintenance system 102 is accessible for entering, recording and reviewing aircraft maintenance information via one or more networks 104. The one or more networks 104 may include the Internet, a private network, a telecommunication network, a mobile network, a wireless network and other network configuration.

The one or more networks 104 provide controlled access to the secured maintenance system 102 to various entities for entering, recording and reviewing aircraft maintenance information. The various entities may include aircraft equipment 106 such as a central maintenance computer (CMC) or remote terminal for automatically uploading aircraft maintenance information to the secured maintenance system 102, aircraft maintenance personnel 108 (e.g., Maintainer) for manually entering aircraft maintenance information to the secured maintenance system 102, an airline operator 110 including the airline operator that operates the aircraft about which maintenance information is recorded, an airline operator that operates the same model or type of aircraft about which maintenance information is recorded, or some other airline operator that wishes to view maintenance information about a specific type of aircraft. The various entities may also include airworthiness authorities 112 such as the Federal Aviation Administration (FAA) in the United States, the Transport Canada Civil Aviation Directorate (TCCA), or the European Aviation Safety Agency (EASA).

Figure 2:
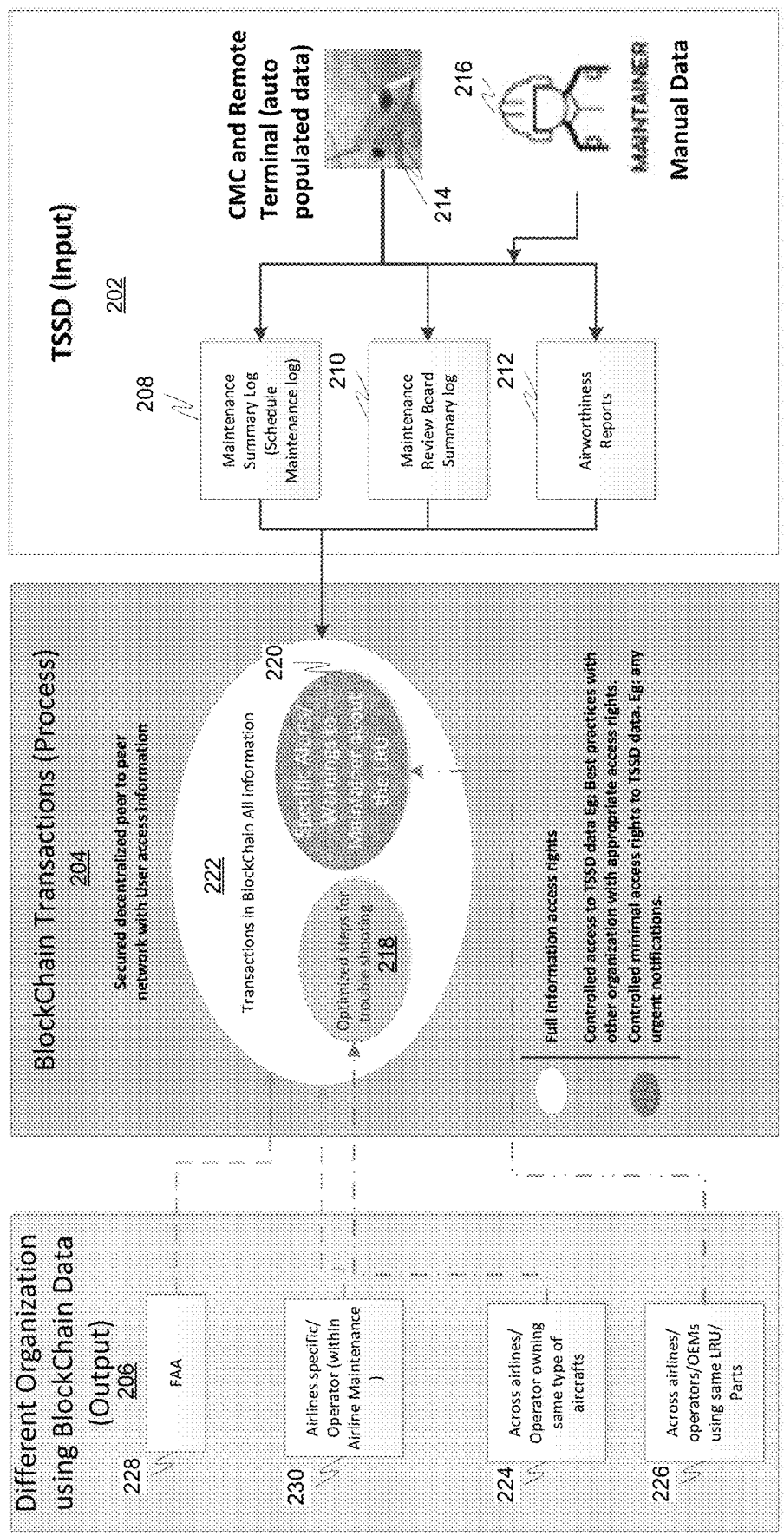
FIG. 2 is a block diagram depicting an example use case environment of a secured maintenance system, in accordance with some embodiments.

FIG. 2 is a block diagram depicting an example use case environment 200 of a secured maintenance system (e.g., secured maintenance system 102). The example environment 200 illustrates the entry of a type of aircraft maintenance data referred to as troubleshooting summary secured data (TSSD) (operations 202), the use of a peer to peer network using a Blockchain framework to secure the TSSD (operations 204), and various entities 206 that may have different levels of controlled access to the stored TSSD.

The aircraft maintenance data entries may consist of troubleshooting summary secured data (TSSD) retrieved during and/or after aircraft maintenance checks. Aircraft maintenance checks are periodic inspections that are required on commercial/civil aircraft after a certain amount of time or usage. At the completion of any maintenance task a person authorized by the national airworthiness authority signs a maintenance release stating that maintenance has been performed in accordance with the applicable airworthiness requirements. The TSSD may include data that is included in a maintenance release. A maintenance release may include a maintenance summary log 208, a maintenance review board summary log 210, and/or airworthiness report 212.

The example maintenance system is configured to enter a plurality of aircraft maintenance data entries, each as a unique transaction, in a peer to peer network using a Blockchain framework, wherein each entered data entry may only be entered when accompanied by a smart maintenance key that authorizes the entry of the aircraft maintenance data entry. The TSSD may be entered partially by aircraft equipment 214, such as a central maintenance computer (CMC) or a remote terminal, and partially by maintenance personnel 216. The TSSD entered by aircraft equipment 214 is retrieved from maintenance information captured by aircraft equipment, and this TSSD is automatically entered into electronic maintenance records by the aircraft equipment 214 as a unique transaction in the peer to peer network. Various entities may be provided a smart maintenance key that authorizes the entry of specific types or portions of TSSD. For example, a first line maintainer may have a first key authorizing the entry of specific TSSD, a second level reviewer may have a second key authorizing the second level reviewer to inspect the TSSD entered by the first line maintainer and to enter other specific TSSD, and a third level reviewer may have a third key authorizing the third level reviewer to inspect the TSSD entered by the first line maintainer and the second level reviewer and to enter additional specific TSSD. This can help ensure that the proper personnel and only the proper personnel enter specific TSSD into the maintenance system.

As a result, the example maintenance system provides a plurality of access levels for accessing and entering aircraft maintenance data entries, wherein each access level provides access for retrieval of a specific class of aircraft maintenance data entry transactions and input of a specific class of aircraft maintenance data entry transactions. To control access for entering aircraft maintenance data entries, the maintenance system provides a plurality of unique sets of smart maintenance keys, wherein each unique set of smart maintenance keys corresponds to an access level for the retrieval of aircraft maintenance data entry transactions and an access level for the input of aircraft maintenance data entry transactions.

Because of the nature of the peer to peer network using a Blockchain framework, once TSSD is entered it cannot be erased or changed. Thus, all transactions relating to the TSSD is permanently recorded. The maintenance system is configured to update a private ledger on the peer to peer network for each unique transaction. The maintenance system is configured to search the private ledger to identify the location of transactions that are available for read-only access.

The example maintenance system is also configured to provide read-only access to the TSSD. The example maintenance system is configured to provide different levels of read-only access. The maintenance system may provide a plurality of access levels for read-only access to review the TSSD transactions. In this example, three levels of read-only access are depicted. In this example, the maintenance system provides a first level of controlled access to a first subset 218 of the TSSD to an entity 224 possessing a first level controlled access pair of keys; a second level of controlled access to a second subset 220 of the TSSD to an entity 226 possessing a second level controlled access pair of keys, wherein the first level of controlled access is different from the second level of controlled access; and a third level of controlled access to the entire TSSD 222 to an entity 228, 230 possessing a third level controlled access pair of keys.

The maintenance system is further configured to provide a user interface that identifies the usage life cycle of the TSSD in the peer to peer network. In one example, to identify the usage life cycle of the TSSD, the user interface is configured to identify the current organization involved in maintenance for the aircraft, the type of maintenance personnel currently involved in maintenance for the aircraft, the current state of the TSSD artifacts life cycle wherein a TSSD artifact contains the form that captures various aspects of maintenance, and the geographical location of the TSSD artifact. The geographical location may consist of one of the aircraft, an aircraft hangar, maintenance hub, MRO (maintenance, repair, overhaul) shop, or FAA office.

Figure 3:
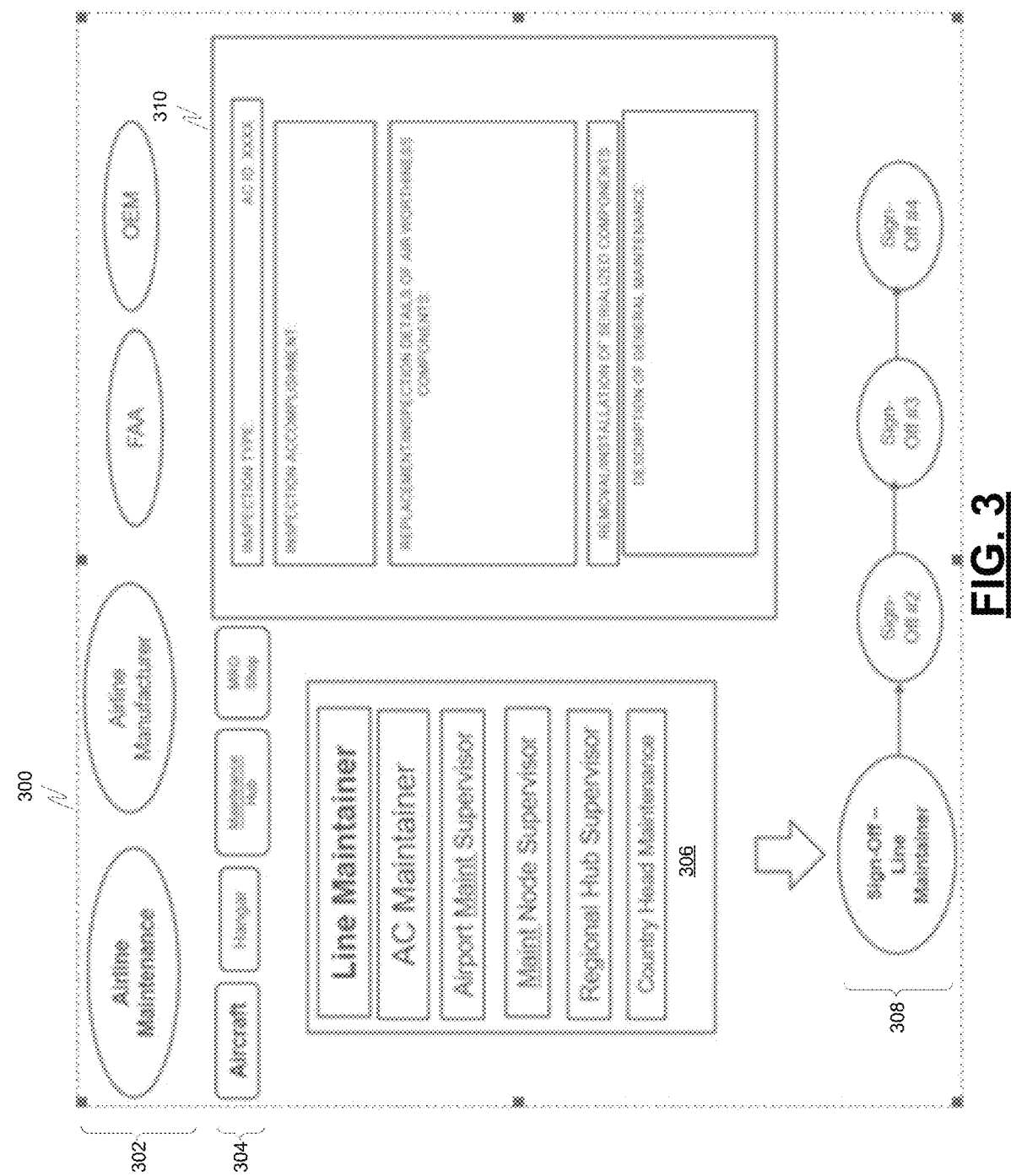
FIG. 3 is a diagram depicting an example user interface (UI) for a secured maintenance system that identifies the usage life cycle of the TSSD in the peer to peer network, in accordance with some embodiments.

FIG. 3 is a diagram depicting an example user interface (UI) 300 for a secured maintenance system that identifies the usage life cycle of the TSSD in the peer to peer network. The example UI 300 displays icons 302 for identifying the organizations that may be involved in maintenance for the aircraft, icons 304 for identifying the geographical location for the capture of a TSSD artifact, icons 306 for example maintenance personnel types involved in maintenance for the aircraft, icons 308 for example sign-offs for the TSSD from the example personnel, and a display 310 of the current state of the TSSD artifacts life cycle wherein the TSSD artifact contains the form that captures various aspects of maintenance.

The icons 302 for identifying the organizations include icons for airline maintenance, airline manufacturer, FAA, OEM. In this example, the UI identifies (e.g., via bolded text) that airline maintenance is the current organization involved in maintenance for the aircraft.

The icons 304 for identifying the geographical location of the TSSD artifact may include icons for an aircraft, an aircraft hangar, a maintenance hub, a MRO shop, and an FAA office (not shown). In this example, the UI identifies (via bolded text) the geographical location of the TSSD artifact to be at the Aircraft.

The icons 306 for example maintenance personnel types involved in maintenance for the aircraft include icons for a line Maintainer, Aircraft Maintainer, Airport maintenance Supervisor, Maintenance Node Supervisor, Regional Hub supervisor, and Country Head Maintenance. In this example, the UI identifies (e.g., via bolded text) that the Line Maintainer is the maintenance personnel type currently involved in maintenance for the aircraft.

The icons 308 for example sign-offs include icons for sign-off from the line maintainer, sign-off #2 from the next (second) level maintainer, sign-off #3 from the next (third) level maintainer, and sign-off from the next (fourth) level maintainer. In this example, the UI indicates (via bolded text) that the current the maintenance data entry requires Sign-Off from a Line Maintainer.

The display 310 of example maintenance form entries for entering TSSD include entries from a form to be filled out and signed-off by Airline Maintenance personnel, the Line Maintainer in specific, at the Aircraft. In this example, the UI identifies the current state of the TSSD artifacts life cycle wherein the TSSD artifact contains the form that captures various aspects of maintenance, which may include the Inspection type, Inspection Accomplishment, Replacement/Inspection Details of air worthiness components, and description of general maintenance.

Figure 4:
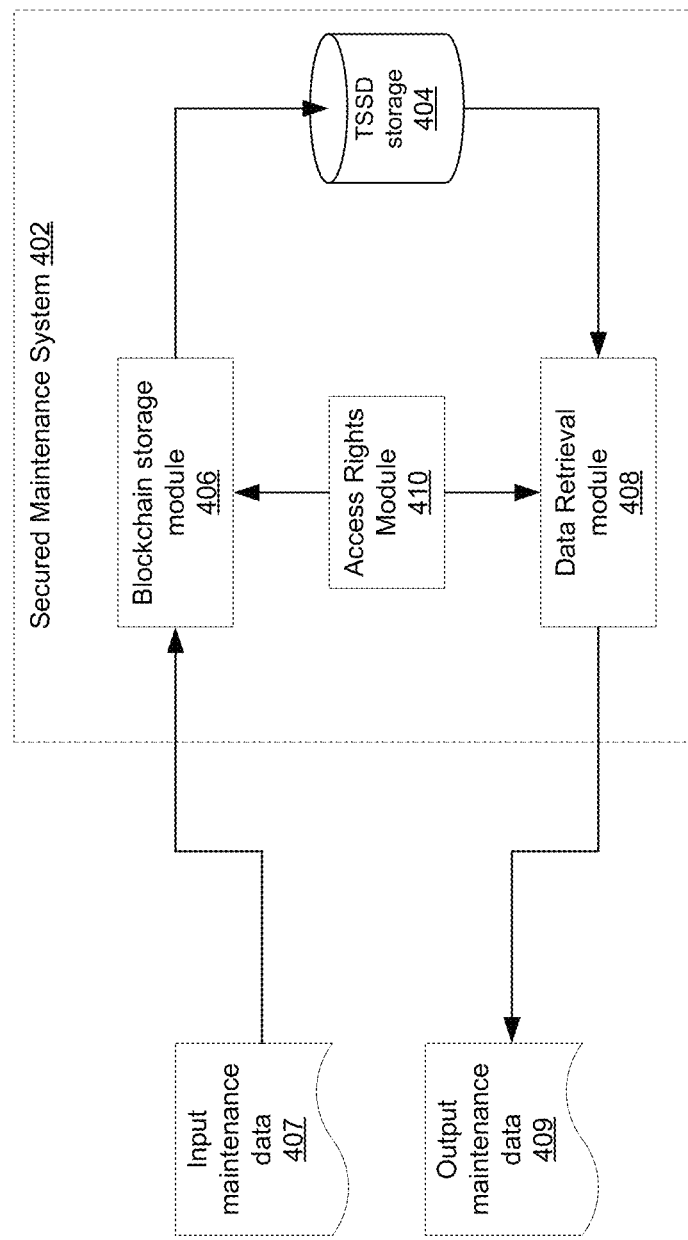
FIG. 4 is a block diagram of an example secured maintenance system in a peer to peer network, in accordance with some embodiments.

FIG. 4 is a block diagram depicting an example secured maintenance system 402 in a peer to peer network. The example secured maintenance system 402 includes TSSD storage 404, a blockchain storage module 406, a data retrieval module 408, and an access rights module 410. The example maintenance system 402 includes a controller that is configured to implement the blockchain storage module 406, data retrieval module 408, and access rights module 410. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example secured maintenance system 402 is configured to: provide a plurality of data entry access levels to the maintenance system for accessing and entering aircraft maintenance data in the form of troubleshooting summary secured data (TSSD), wherein each data entry access level provides access for retrieval of a specific class of TSSD and input of a specific class of TSSD; provide a plurality of unique sets of smart maintenance keys, wherein each unique set of smart maintenance keys corresponds to one of the plurality of data entry access levels for accessing and entering TSSD; enter TSSD from a plurality of sources, wherein each entry of TSSD is entered as a unique transaction, in a peer to peer network using a Blockchain framework, and wherein each entry of TSSD is received from a source presenting a set of smart maintenance keys that authorizes the entry of the TSSD presented for entry by the source; update a private ledger on the peer to peer network for each unique transaction; provide a first level of controlled access to a first subset of entered TSSD to an entity possessing a first level controlled access set of keys; provide a second level of controlled access to a second subset of the entered TSSD to an entity possessing a second level controlled access set of keys, wherein the first level of controlled access is different from the second level of controlled access; and provide a third level of controlled access to all of the entered TSSD to an entity possessing a third level controlled access set of keys.

The TSSD storage 404 is configured to store TSSD entered into the peer to peer network using a Blockchain framework. The blockchain storage module 406 is configured to receive TSSD (e.g., input maintenance data 407), cause the received TSSD to be stored in the TSSD storage 404 in the peer to peer network using a Blockchain framework, create and update transaction information/details regarding the received TSSD, update a private ledger on the transaction(s), and update permission details of the transaction(s). The data retrieval module 408 is configured to search through the ledger to identify Blockchain framework transactions to be output as output maintenance data 409. The access rights module 410 is configured to verify smart maintenance keys to authorize the blockchain storage module 406 to cause TSSD to be stored in the TSSD data storage 404. The access rights module 410 is also configured to verify controlled access keys to authorize the data retrieval module 408 to search through the ledger to identify Blockchain framework transactions to be output as output maintenance data 409.

Figure 5:
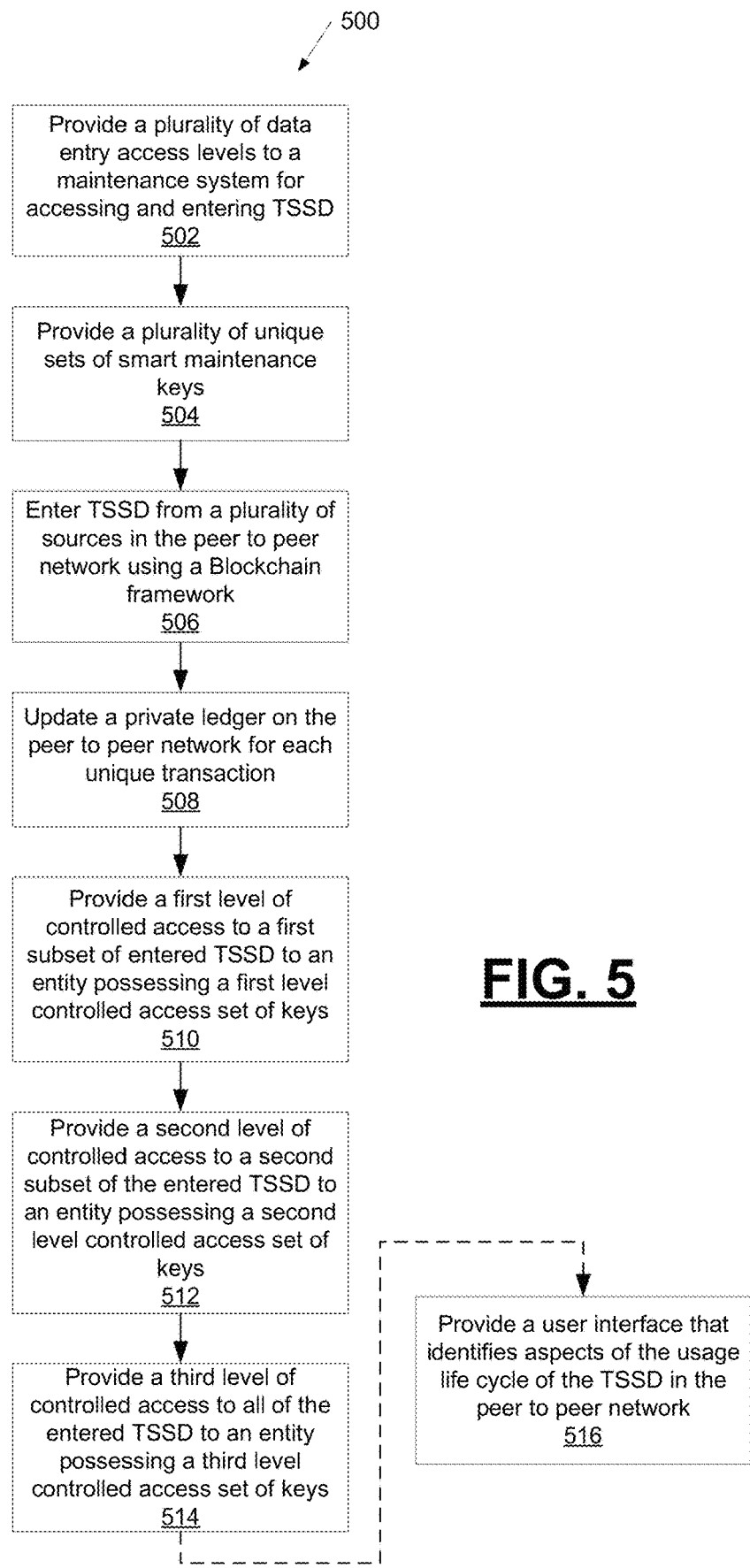
FIG. 5 is a process flow chart depicting an example process in a peer to peer network to record maintenance data, in accordance with some embodiments.

FIG. 5 is a process flow chart depicting an example process 500 in an example peer to peer network to record maintenance data. The order of operation within the process 500 is not limited to the sequential execution as illustrated in the figure, but may be performed in one or more varying orders as applicable and in accordance with the present disclosure.

The example process 500 includes providing a plurality of data entry access levels to a maintenance system for accessing and entering TSSD (operation 502). Each data entry access level provides access for retrieval of a specific class of TSSD and input of a specific class of TSSD.

The example process 500 includes providing a plurality of unique sets of smart maintenance keys (operation 504). Each unique set of smart maintenance keys corresponds to one of the plurality of data entry access levels for accessing and entering TSSD. Providing a plurality of unique sets of smart maintenance keys may comprise: providing access to the peer to peer network to a Maintainer via a unique set of smart maintenance keys for manual entry of maintenance information and providing access to the peer to peer network to a plurality of successive next level reviewers, via unique pairs of smart maintenance keys, to review entered TSSD and perform assigned activity The example process 500 includes entering TSSD from a plurality of sources in the peer to peer network using a Blockchain framework (operation 506). Each entry of TSSD is entered as a unique transaction. Each entry of TSSD is received from a source presenting a set of smart maintenance keys that authorizes the entry of the TSSD presented for entry by the source. The entered TSSD may comprise data that is included in a maintenance summary log, a maintenance review board summary log, and/or an airworthiness report. The entered TSSD may comprise data retrieved from maintenance information captured and automatically entered into electronic maintenance records by aircraft equipment as a unique transaction in the peer to peer network. The entered TSSD may comprise data retrieved from maintenance information manually entered by a first level maintenance personnel type as a unique transaction in the peer to peer network. The entered TSSD may comprise data retrieved from maintenance information manually entered by a plurality of successive next level reviewers as unique transactions in the peer to peer network. The example process 500 further includes updating a private ledger on the peer to peer network for each unique transaction (operation 508).

The example process 500 includes providing a first level of controlled access to a first subset of entered TSSD to an entity possessing a first level controlled access set of keys (operation 510); providing a second level of controlled access to a second subset of the entered TSSD to an entity possessing a second level controlled access set of keys, wherein the first level of controlled access is different from the second level of controlled access (operation 512); and providing a third level of controlled access to all of the entered TSSD to an entity possessing a third level controlled access set of keys (operation 514).

The example process 500 may optionally include providing a user interface that identifies aspects of the usage life cycle of the TSSD in the peer to peer network (operation

516). The aspects of the usage life cycle of the TSSD may comprise the current organization involved in maintenance for the aircraft, the maintenance personnel type currently involved in maintenance for the aircraft, the current state of the TSSD artifacts life cycle wherein a TSSD artifact contains a form that captures various aspects of maintenance, and the geographical location of the TSSD artifact. The provided user interface may, for example, be the user interface depicted in FIG. 3 and described above.

Figure 6:
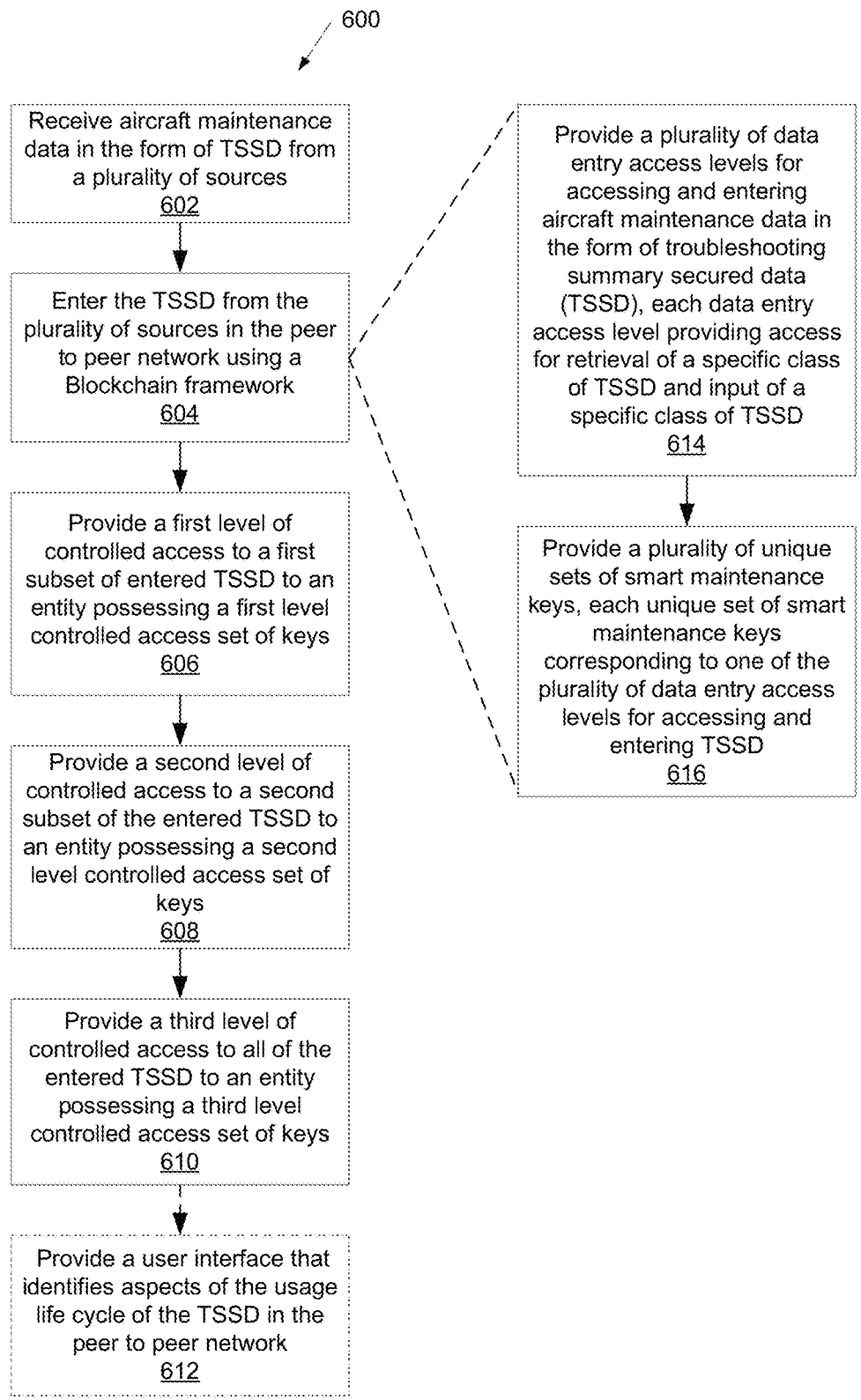
FIG. 6 is a process flow chart depicting another example process in a peer to peer network for recording maintenance data, in accordance with some embodiments.

FIG. 6 is a process flow chart depicting an example process 600 in a peer to peer network for recording maintenance data. The order of operation within the process 600 is not limited to the sequential execution as illustrated in the figure, but may be performed in one or more varying orders as applicable and in accordance with the present disclosure.

The example process 600 includes receiving aircraft maintenance data in the form of troubleshooting summary secured data (TSSD) from a plurality of sources (operation 602). Each source providing TSSD has a unique set of smart maintenance keys.

The example process 600 includes entering the TSSD from the plurality of sources in the peer to peer network using a Blockchain framework (operation 604). TSSD from a source is entered as a unique transaction in the Blockchain framework when the set of smart maintenance keys from the source authorizes the entry of the TSSD. The entered TSSD may include data that is included in a maintenance summary log, a maintenance review board summary log, and/or an airworthiness report.

To empower the example process 600 to enter the TSSD from the plurality of sources in the peer to peer network using a Blockchain framework when a set of smart maintenance keys from the source authorizes the entry of the TSSD, the example process 600 may include providing a plurality of data entry access levels for accessing and entering aircraft maintenance data in the form of troubleshooting summary secured data (TSSD), each data entry access level providing access for retrieval of a specific class of TSSD and input of a specific class of TSSD (operation 614); and providing a plurality of unique sets of smart maintenance keys, each unique set of smart maintenance keys corresponding to one of the plurality of data entry access levels for accessing and entering TSSD (operation 616).

The example process 600 includes providing a first level of controlled access to a first subset of entered TSSD to an entity possessing a first level controlled access set of keys (operation 606); providing a second level of controlled access to a second subset of the entered TSSD to an entity possessing a second level controlled access set of keys, wherein the first level of controlled access is different from the second level of controlled access (operation 608); and providing a third level of controlled access to all of the entered TSSD to an entity possessing a third level controlled access set of keys (operation 610).

The example process 600 optionally includes providing a user interface that identifies aspects of the usage life cycle of the TSSD in the peer to peer network (operation 612). The aspects of the usage life cycle of the TSSD may include the current organization involved in maintenance for the aircraft, the maintenance personnel type currently involved in maintenance for the aircraft, the current state of the TSSD artifacts life cycle wherein a TSSD artifact contains a form that captures various aspects of maintenance, and the geographical location of the TSSD artifact.

Described herein are apparatus, systems, techniques and articles for securing maintenance data using a blockchain framework. In one embodiment, a maintenance system for securely maintaining aircraft maintenance operations transactions is provided. The maintenance system comprises one or more processors configured by programming instructions on non-transient computer readable media. The maintenance system is configured to: provide a plurality of data entry access levels to the maintenance system for accessing and entering aircraft maintenance data in the form of troubleshooting summary secured data (TSSD), wherein each data entry access level provides access for retrieval of a specific class of TSSD and input of a specific class of TSSD; provide a plurality of unique sets of smart maintenance keys, wherein each unique set of smart maintenance keys corresponds to one of the plurality of data entry access levels for accessing and entering TSSD; enter TSSD from a plurality of sources, wherein each entry of TSSD is entered as a unique transaction, in a peer to peer network using a Blockchain framework, and wherein each entry of TSSD is received from a source presenting a set of smart maintenance keys that authorizes the entry of the TSSD presented for entry by the source; update a private ledger on the peer to peer network for each unique transaction; provide a first level of controlled access to a first subset of entered TSSD to an entity possessing a first level controlled access set of keys; provide a second level of controlled access to a second subset of the entered TSSD to an entity possessing a second level controlled access set of keys, wherein the first level of controlled access is different from the second level of controlled access; and provide a third level of controlled access to all of the entered TSSD to an entity possessing a third level controlled access set of keys.

These aspects and other embodiments may include one or more of the following features. The entered TSSD may comprise data that is included in a maintenance summary log, a maintenance review board summary log, and/or an airworthiness report. The entered TSSD may comprise data retrieved from maintenance information captured and automatically entered into electronic maintenance records by aircraft equipment as a unique transaction in the peer to peer network. The entered TSSD may comprise data retrieved from maintenance information manually entered by a first level maintenance personnel type as a unique transaction in the peer to peer network. The entered TSSD may comprise data retrieved from maintenance information manually entered by a plurality of successive next level reviewers as unique transactions in the peer to peer network. To provide a plurality of unique sets of smart maintenance keys, the system may be configured to: provide access to the peer to peer network to a Maintainer via a unique set of smart maintenance keys for manual entry of maintenance information; and provide access to the peer to peer network to a plurality of successive next level reviewers, via unique pairs of smart maintenance keys, to review entered TSSD and perform assigned activity. The maintenance system may be further configured to provide a user interface that identifies aspects of the usage life cycle of the TSSD in the peer to peer network. To identify aspects of the usage life cycle of the TSSD, the user interface may be configured to identify the current organization involved in maintenance for the aircraft, the maintenance personnel type currently involved in maintenance for the aircraft, the current state of the TSSD artifacts life cycle wherein a TSSD artifact contains a form that captures various aspects of maintenance, and the geographical location of the TSSD artifact.

In another embodiment, a method in a peer to peer network for recording maintenance data is provided. The method comprises providing a plurality of data entry access levels to a maintenance system for accessing and entering aircraft maintenance data in the form of troubleshooting summary secured data (TSSD), wherein each data entry access level provides access for retrieval of a specific class of TSSD and input of a specific class of TSSD; providing a plurality of unique sets of smart maintenance keys, wherein each unique set of smart maintenance keys corresponds to one of the plurality of data entry access levels for accessing and entering TSSD; entering TSSD from a plurality of sources, wherein each entry of TSSD is entered as a unique transaction, in the peer to peer network using a Blockchain framework, and wherein each entry of TSSD is received from a source presenting a set of smart maintenance keys that authorizes the entry of the TSSD presented for entry by the source; updating a private ledger on the peer to peer network for each unique transaction; providing a first level of controlled access to a first subset of entered TSSD to an entity possessing a first level controlled access set of keys; providing a second level of controlled access to a second subset of the entered TSSD to an entity possessing a second level controlled access set of keys, wherein the first level of controlled access is different from the second level of controlled access; and providing a third level of controlled access to all of the entered TSSD to an entity possessing a third level controlled access set of keys.

These aspects and other embodiments may include one or more of the following features. The entered TSSD may comprise data that is included in a maintenance summary log, a maintenance review board summary log, and/or an airworthiness report. The entered TSSD may comprise data retrieved from maintenance information captured and automatically entered into electronic maintenance records by aircraft equipment as a unique transaction in the peer to peer network. The entered TSSD may comprise data retrieved from maintenance information manually entered by a first level maintenance personnel type as a unique transaction in the peer to peer network. The entered TSSD may comprise data retrieved from maintenance information manually entered by a plurality of successive next level reviewers as unique transactions in the peer to peer network. Providing a plurality of unique sets of smart maintenance keys may comprise: providing access to the peer to peer network to a Maintainer via a unique set of smart maintenance keys for manual entry of maintenance information; and providing access to the peer to peer network to a plurality of successive next level reviewers, via unique pairs of smart maintenance keys, to review entered TSSD and perform assigned activity. The method may further comprise providing a user interface that identifies aspects of the usage life cycle of the TSSD in the peer to peer network. The aspects of the usage life cycle of the TSSD may comprise the current organization involved in maintenance for the aircraft, the maintenance personnel type currently involved in maintenance for the aircraft, the current state of the TSSD artifacts life cycle wherein a TSSD artifact contains a form that captures various aspects of maintenance, and the geographical location of the TSSD artifact.

In another embodiment, a method in a peer to peer network for recording maintenance data is provided. The method comprises receiving aircraft maintenance data in the form of troubleshooting summary secured data (TSSD) from a plurality of sources, wherein each source has a unique set of smart maintenance keys; entering the TSSD from the plurality of sources in the peer to peer network using a Blockchain framework, wherein TSSD from a source is entered as a unique transaction in the Blockchain framework when the set of smart maintenance keys from the source authorizes the entry of the TSSD; providing a first level of controlled access to a first subset of entered TSSD to an entity possessing a first level controlled access set of keys; providing a second level of controlled access to a second subset of the entered TSSD to an entity possessing a second level controlled access set of keys, wherein the first level of controlled access is different from the second level of controlled access; and providing a third level of controlled access to all of the entered TSSD to an entity possessing a third level controlled access set of keys.

These aspects and other embodiments may include one or more of the following features. The entered TSSD may comprise data that is included in a maintenance summary log, a maintenance review board summary log, and/or an airworthiness report. The method may further comprise: providing a plurality of data entry access levels for accessing and entering aircraft maintenance data in the form of troubleshooting summary secured data (TSSD), wherein each data entry access level provides access for retrieval of a specific class of TSSD and input of a specific class of TSSD; and providing a plurality of unique sets of smart maintenance keys, wherein each unique set of smart maintenance keys corresponds to one of the plurality of data entry access levels for accessing and entering TSSD. The method may further comprise providing a user interface that identifies aspects of the usage life cycle of the TSSD in the peer to peer network, wherein the aspects of the usage life cycle of the TSSD may comprise the current organization involved in maintenance for the aircraft, the maintenance personnel type currently involved in maintenance for the aircraft, the current state of the TSSD artifacts life cycle wherein a TSSD artifact contains a form that captures various aspects of maintenance, and the geographical location of the TSSD artifact.

In another embodiment, an aircraft maintenance system for tracking maintenance operations for an aircraft is provided. The aircraft maintenance system comprises one or more processors configured by programming instructions on non-transient computer readable media. The aircraft maintenance system is configured to: enter troubleshooting summary secured data (TSSD), retrieved from maintenance information captured by aircraft equipment (e.g., central maintenance computer (CMC) on the aircraft) and automatically entered into electronic maintenance reports by the aircraft equipment, as a unique transaction in a peer to peer network using a Blockchain framework; provide access to the peer to peer network to a Maintainer, via a unique set of smart maintenance keys, for manual entry of maintenance information; provide access to the peer to peer network to a plurality of successive next level reviewers, each via a unique pair of smart keys, to review the maintenance records entered in the peer to peer network and perform assigned activity; enter TSSD, that has been manually entered by the Maintainer, as a unique transaction in the peer to peer network; enter TSSD, that has been manually entered by each of the plurality of successive next level reviewers, as unique transactions in the peer to peer network; update a private ledger on the peer to peer network for each unique transaction; provide a first level of controlled access to a first subset of the TSSD to an entity possessing a first level controlled access pair of keys; provide a second level of controlled access to a second subset of the TSSD to an entity possessing a second level controlled access pair of keys, wherein the first level of controlled access is different from the second level of controlled access; provide a third level of controlled access to the entire TSSD to an entity possessing a third level controlled access pair of keys; and provide a user interface that identifies the usage life cycle of the TSSD in the peer to peer network, the user interface identifying the current organization involved in maintenance for the aircraft, the maintenance personnel type currently involved in maintenance for the aircraft, the current state of the TSSD artifacts life cycle wherein the TSSD artifact contains the form that captures various aspects of maintenance, and the geo location of the TSSD artifact wherein the location comprises one of an aircraft hangar, maintenance hub, MRO shop, or FAA office.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A maintenance system for securely maintaining aircraft maintenance operations transactions, the maintenance system comprising:
   one or more hardware processors configured by programming instructions on non-transient computer readable media, the one or more hardware processors of the maintenance system configured to:
   provide a plurality of data entry access levels to the maintenance system for accessing and entering aircraft maintenance data in a form of troubleshooting summary secured data (TSSD), each data entry access level providing access for retrieval of a specific class of TSSD and input of a specific class of TSSD;
   provide a plurality of unique sets of smart maintenance keys, each unique set of smart maintenance keys corresponding to one of the plurality of data entry access levels for accessing and entering TSSD;
   enter TSSD from a plurality of sources, each entry of TSSD as a unique transaction, in a peer to peer network using a Blockchain framework, each entry of TSSD received from a source presenting a set of smart maintenance keys that authorizes the entry of the TSSD presented for entry by the source;
   update a private ledger on the peer to peer network for each unique transaction;

provide a first level of controlled access to a first subset of the entered TSSD to an entity possessing a first level controlled access set of keys;

indicate that the first subset of the entered TSSD has been changed by the entity possessing the first level controlled access set of keys and requires sign-off from an entity possessing a level higher than the first level;

provide a second level of controlled access to a second subset of the entered TSSD to an entity possessing a second level controlled access set of keys, wherein the first level of controlled access is different from the second level of controlled access;

indicate that the first subset of the entered TSSD has been reviewed and the second subset of entered TSSD has been changed by the entity possessing the second level controlled access set of keys and requires sign-off from an entity possessing a level higher than the second level; and provide a third level of controlled access to all of the entered TSSD to an entity possessing a third level controlled access set of keys.

2. The maintenance system of claim 1, wherein the entered TSSD comprises data that is included in a maintenance summary log, a maintenance review board summary log, and/or an airworthiness report.

3. The maintenance system of claim 2, wherein the entered TSSD comprises data retrieved from maintenance information captured and automatically entered into electronic maintenance records by aircraft equipment as a unique transaction in the peer to peer network.

4. The maintenance system of claim 3, wherein the entered TSSD comprises data retrieved from maintenance information manually entered by a first level maintenance personnel type as a unique transaction in the peer to peer network.

5. The maintenance system of claim 4, wherein the entered TSSD comprises data retrieved from maintenance information manually entered by a plurality of successive next level reviewers as unique transactions in the peer to peer network.

6. The maintenance system of claim 1, wherein to provide a plurality of unique sets of smart maintenance keys, the maintenance system is configured to:

provide access to the peer to peer network to a Maintainer via a unique set of smart maintenance keys for manual entry of maintenance information; and provide access to the peer to peer network to a plurality of successive next level reviewers, via unique pairs of smart maintenance keys, to review entered TSSD and perform assigned activity.

7. The maintenance system of claim 1, further configured to provide a user interface that identifies aspects of a usage life cycle of the TSSD in the peer to peer network.

8. The maintenance system of claim 7, wherein to identify aspects of the usage life cycle of the TSSD, the user interface is configured to identify a current organization involved in maintenance for the aircraft, a maintenance personnel type currently involved in maintenance for the aircraft, a current state of a life cycle of a TSSD artifact of the TSSD wherein the TSSD artifact contains a form that captures various aspects of maintenance, and a geographical location of the TSSD artifact.

9. A method in a peer to peer network for recording maintenance data, the method comprising:

providing a plurality of data entry access levels to a maintenance system for accessing and entering aircraft maintenance data in a form of troubleshooting summary secured data (TSSD), each data entry access level providing access for retrieval of a specific class of TSSD and input of a specific class of TSSD;

providing a plurality of unique sets of smart maintenance keys, each unique set of smart maintenance keys corresponding to one of the plurality of data entry access levels for accessing and entering TSSD;

entering TSSD from a plurality of sources, each entry of TSSD as a unique transaction, in the peer to peer network using a Blockchain framework, each entry of TSSD received from a source presenting a set of smart maintenance keys that authorizes the entry of the TSSD presented for entry by the source;

updating a private ledger on the peer to peer network for each unique transaction;

providing a first level of controlled access to a first subset of the entered TSSD to an entity possessing a first level controlled access set of keys;

indicating that the first subset of the entered TSSD has been changed by the entity possessing the first level controlled access set of keys and requires sign-off from an entity possessing a level higher than the first level;

providing a second level of controlled access to a second subset of the entered TSSD to an entity possessing a second level controlled access set of keys, wherein the first level of controlled access is different from the second level of controlled access;

indicating that the first subset of the entered TSSD has been reviewed and the second subset of entered TSSD has been changed by the entity possessing the second level controlled access set of keys and requires sign-off from an entity possessing a level higher than the second level; and providing a third level of controlled access to all of the entered TSSD to an entity possessing a third level controlled access set of keys.

10. The method of claim 9, wherein the entered TSSD comprises data that is included in a maintenance summary log, a maintenance review board summary log, and/or an airworthiness report.

11. The method of claim 10, wherein the entered TSSD comprises data retrieved from maintenance information captured and automatically entered into electronic maintenance records by aircraft equipment as a unique transaction in the peer to peer network.

12. The method of claim 11, wherein the entered TSSD comprises data retrieved from maintenance information manually entered by a first level maintenance personnel type as a unique transaction in the peer to peer network.

13. The method of claim 12, wherein the entered TSSD comprises data retrieved from maintenance information manually entered by a plurality of successive next level reviewers as unique transactions in the peer to peer network.

14. The method of claim 9, wherein providing a plurality of unique sets of smart maintenance keys comprises:

providing access to the peer to peer network to a Maintainer via a unique set of smart maintenance keys for manual entry of maintenance information; and providing access to the peer to peer network to a plurality of successive next level reviewers, via unique pairs of smart maintenance keys, to review entered TSSD and perform assigned activity.

15. The method of claim 9, further comprising providing a user interface that identifies aspects of a usage life cycle of the TSSD in the peer to peer network.

16. The method of claim 15, wherein the aspects of the usage life cycle of the TSSD comprises a current organization involved in maintenance for the aircraft, a maintenance personnel type currently involved in maintenance for the aircraft, a current state of a life cycle of a TSSD artifact of the TSSD wherein the TSSD artifact contains a form that captures various aspects of maintenance, and a geographical location of the TSSD artifact.

17. A method in a peer to peer network for recording maintenance data, the method comprising:
   receiving aircraft maintenance data in a form of troubleshooting summary secured data (TSSD) from a plurality of sources, each source having a unique set of smart maintenance keys;
   entering the TSSD from the plurality of sources in the peer to peer network using a Blockchain framework, wherein TSSD from a source is entered as a unique transaction in the Blockchain framework when the set of smart maintenance keys from the source authorizes entry of the TSSD;
   providing a first level of controlled access to a first subset of the entered TSSD to an entity possessing a first level controlled access set of keys;
   indicating that the first subset of the entered TSSD has been changed by the entity possessing the first level controlled access set of keys and requires sign-off from an entity possessing a level higher than the first level;
   providing a second level of controlled access to a second subset of the entered TSSD to an entity possessing a second level controlled access set of keys, wherein the first level of controlled access is different from the second level of controlled access;
   indicating that the first subset of the entered TSSD has been reviewed and the second subset of entered TSSD has been changed by the entity possessing the second level controlled access set of keys and requires sign-off from an entity possessing a level higher than the second level; and
   providing a third level of controlled access to all of the entered TSSD to an entity possessing a third level controlled access set of keys.

18. The method of claim 17, wherein the entered TSSD comprises data that is included in a maintenance summary log, a maintenance review board summary log, and/or an airworthiness report.

19. The method of claim 17, further comprising:
   providing a plurality of data entry access levels for accessing and entering aircraft maintenance data in the form of troubleshooting summary secured data (TSSD), each data entry access level providing access for retrieval of a specific class of TSSD and input of a specific class of TSSD; and
   providing a plurality of unique sets of smart maintenance keys, each unique set of smart maintenance keys corresponding to one of the plurality of data entry access levels for accessing and entering TSSD.

20. The method of claim 17, further comprising providing a user interface that identifies aspects of a usage life cycle of the TSSD in the peer to peer network, wherein the aspects of the usage life cycle of the TSSD comprises a current organization involved in maintenance for the aircraft, a maintenance personnel type currently involved in maintenance for the aircraft, a current state of a life cycle of a TSSD artifact of the TSSD wherein the TSSD artifact contains a form that captures various aspects of maintenance, and a geographical location of the TSSD artifact.

* * * * *